United States Patent [19]

Seebode et al.

[11] 3,926,049

[45] Dec. 16, 1975

[54] QUADRATURE-VOLTAGE BALANCING CIRCUIT OR ELECTROMAGNETIC FLOWMETER

[75] Inventors: Albert Seebode, Rosdorf; Eggert Appel, Dransfeld; Gottfried Geisler, Gottingen, all of Germany

[73] Assignee: Fischer & Porter Co., Warminster, Pa.

[22] Filed: Aug. 20, 1974

[21] Appl. No.: 499,014

[30] Foreign Application Priority Data
Nov. 3, 1973 Germany............................ 2355085

[52] U.S. Cl. .......................................... 73/194 EM
[51] Int. Cl.² ........................................... G01F 1/58
[58] Field of Search ................................ 73/194 EM

[56] References Cited
UNITED STATES PATENTS

| | | | |
|---|---|---|---|
| 3,078,712 | 2/1963 | Koblenz et al. | 73/194 EM |
| 3,339,410 | 9/1967 | Stern | 73/194 EM |
| 3,757,773 | 9/1973 | Kolin | 73/194 EM |

*Primary Examiner*—Charles A. Ruehl

[57] ABSTRACT

A balancing circuit interposed between a primary electromagnetic flowmeter, wherein fluid to be measured passes through a flow tube to intersect a transverse magnetic field to induce a signal in electrodes projecting into a tube, and an amplifier responsive to this signal. The balancing circuit is adapted to compensate for quadrature voltage induced in the leads extending from the electrodes whereby the signal applied to the amplifier is free of quadrature voltage and accurately reflects flow rate.

8 Claims, 4 Drawing Figures

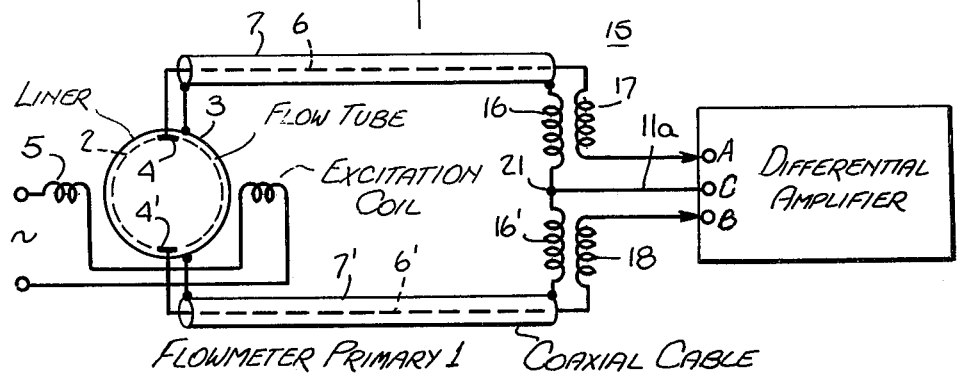
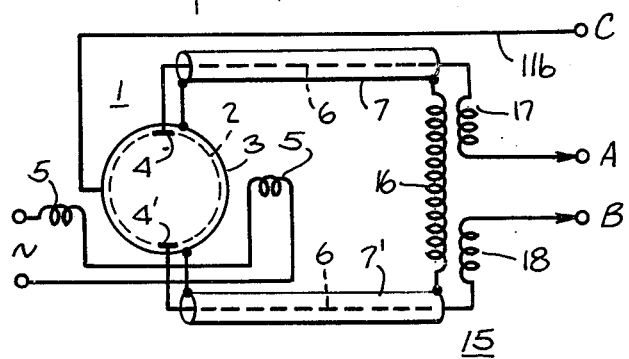
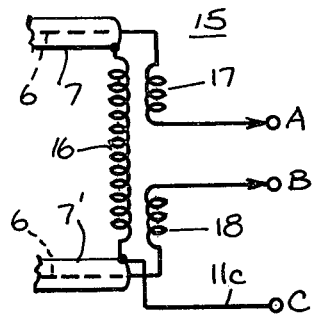
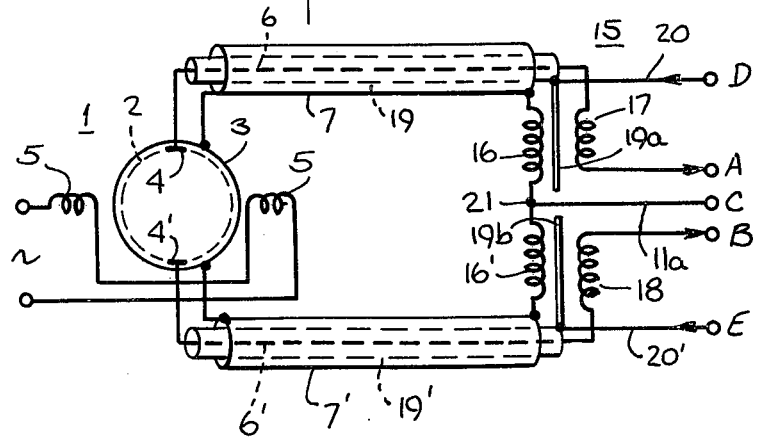

3,926,049

QUADRATURE-VOLTAGE BALANCING CIRCUIT OR ELECTROMAGNETIC FLOWMETER

BACKGROUND OF THE INVENTION

This invention relates generally to electromagnetic flowmeter systems, and in particular to a balancing circuit to compensate for transformer-induced guadrature voltages.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this transverse field, a voltage is induced therein which is transferred to the electrodes. This signal, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are:

Source 1. Stray capacitance-coupled voltages from the coil of the electromagnet to the electrodes, and Source 2. Induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress. The spurious voltage resulting from the transformer flux coupling into the signal leads is usually referred to as the quadrature voltage, for it is assumed to be 90° out of phase with the A-C flow-induced voltage.

While various means have heretofore been employed to buck-out or minimize quadrature voltage, known types of circuits for this purpose are relatively complex and expensive.

SUMMARY OF THE INVENTION

In view of the foregoing, it is the main object of this invention to provide a balancing circuit for an electromagnetic flowmeter to compensate for transformer-induced quadrature voltage, whereby the output signal is substantially free of spurious components and affords an accurate indication of flow rate.

More particularly it is an object of this invention to provide a balancing circuit of the above type which operates efficiently and reliably, and is of simple and inexpensive design.

Briefly stated, in a balancing circuit according to the invention, first and second coaxial cables are provided, each having an inner conductor and an outer conductor. Also provided is a transformer assembly having first and second sections, each having a primary and a secondary, the primaries being serially-connected.

The first and second electrodes of the electromagnetic flowmeter are connected through the inner conductors of the first and second cables in series with the respective secondaries of the first and second transformer sections to the input terminals of a differential amplifier, thereby amplifying the flow rate signal yielded by the electrodes. The ends of the series-connected primaries are connected through the outer conductors of the first and second calbes to external points in the metallic flow tube of the flowmeter, whereby the quadrature voltage induced in said inner conductors is applied to said secondaries and the quadrature voltage induced in said outer conductors is applied to said primaries, each section of said transformer assembly having a one-to-one ratio whereby the quadrature voltages are substantially balanced out and the signal applied to said amplifier is free of a quadrature voltage component.

OUTLINE OF THE DRAWING

For a better understanding of the invention as well as other objects and further features thereof, reference is made to the following detailed description to be read in conjunction with the accompanying drawings, wherein:

FIG. 1 is a schematic circuit diagram of a first embodiment of a symmetrical balancing circuit in accordance with the invention;

FIG. 2 is a modification of the arrangement shown in FIG. 1;

FIG. 3 is a schematic circuit diagram of an asymmetrical balancing circuit in accordance with the invention;

FIG. 4 is a schematic circuit diagram of a second embodiment of a symmetrical balancing circuit.

DESCRIPTION OF THE INVENTION

Referring now to FIG. 1, there is shown an electromagnetic flowmeter whose primary, generally designated by numeral 1, comprises a metallic flow tube 3 which is interposed in a pipeline conducting the fluid whose flow rate is to be measured, the tube having an internal insulating liner 2. Projecting into the interior of the flow tube and in contact with the fluid flowing therethrough are diametrically-opposed electrodes 4 and 4'.

A magnetic field which is transverse to the direction of fluid flow is established by a pair of electromagnetic coils 5 which are excited by alternating-current power, whereby the signal induced in electrodes 4 and 4' has a true signal component proportional to flow velocity and a spurious signal component constituted by a transformer-induced quadrature voltage.

The balancing circuit associated with the flowmeter primary includes a transformer asembly 15 having a centertapped primary winding found by sections 16 and 16', a secondary winding 17 associated with section 16 and a secondary winding 18 associated with section 16', the primary and secondary windings being bifilar. In practice, instead of a single transformer assembly having a centertapped primary, the same arrangement may be formed by a pair of transformers.

Also provided is a pair of identical coaxial cables having inner conductors 6 and 6' and outer conductors 7 and 7' which surround and serve to shield the inner conductors. Inner conductor 6 extends between and is connected to electrode 4 and one end of secondary winding 17, the other end of this winding going to an output terminal A. Inner conductor 6' extends between and is connected to electrode 4' and one end of secondary winding 18 whose other end goes to an output terminal B.

Outer conductor 7 of the first coaxial cable is connected to and extends between an external point on metal flow tube 3 adjacent electrode 4 and primary winding section 16, while outer conductor 7' of the second coaxial cable is similarly connected between an external point on metallic flow tube 3 adjacent electrode 4' and primary winding section 16'. The centertap 21 of these primary sections is connected via lead 11a to a reference terminal C. Terminals A and B are connected to the input terminals of a differential amplifier, terminal C being the reference terminal with respect to these inputs.

Since terminals A and B are connected through transformer secondaries 17 and 18 to measuring electrodes 4 and 4', applied to the inputs of the differential amplifier is the true signal cmponent developed at these electrodes. But since there is also an internal transformer-induced quadrature voltage developed in the inner conductors connected to measuring electrodes 4 and 4', this voltage also appears in secondary windings 17 and 18. And because an external quadrature voltage is also induced in outer conductors 7 and 7' of the coaxial cables, this quadrature voltage appears in primary winding section 16 and in primary winding section 16'.

The transformer ratio of primary winding section 16 to secondary winding 17 is 1:1 and the same ratio exists as between primary winding section 16' and secondary winging 18. Since the quadrature voltages in these windings are in opposition to each other, the quadrature voltages are effectively cancelled out, so that all that is applied to the differential amplifier is the true signal component, whereby the flowmeter reading is free of quadrature component and accurately reflects the flow rate.

Instead of a center tap on primary winding as shown in FIG. 1, one can use a simpler transformer as shown in FIG. 2 which lacks a center tap, in which event reference terminal C is connected via a line 11b to a point in metallic flow tube 3 symmetrically disposed with respect to the points at which the outer conductors 7 and 7' are connected. The circuit in FIG. 2 is in all other respects the same as that in FIG. 1 and functions in essentially the same way.

In the balancing circuit arrangement shown in FIG. 3, primary 16 is again without a center tap, but in this instance terminal C is connected by a line 11C to the junction of outer cnductor 7' and one end of the primary 16; hence this arrangement is asymmetrical.

In the balancing circuit arrangement shown in FIG. 4, interposed between inner conductors 6 and 6' and outer conductors 7 and 7' of the coaxial cables and concentric therewith are tubular intermediate conductors 19 and 19' which are connected to driven shields 19a and 19b, respectively. These shields are externally controlled by means of voltages applied thereto through lines 20 and 20' connected to terminal D and E respectively of the differential amplifier. Intermediate conductors 19 and 19' serve to shield the inner conductors and the transformer 15 in order to eliminate the effects of cable capacitances in the area of the balancing circuit. The arrangement is otherwise the same as that shown in FIG. 1.

While there has been shown and described preferred embodiments in accordance with the invention, it will be appreciated that many changes and modifications may be made therein without, however, departing from the essential spirit thereof.

We claim:

1. In combination with an electromagnetic flowmeter wherein a fluid whose flow rate is to be measured is conducted through a metallic flow tube to intersect a transverse alternatingcurrent magnetic field whereby a signal representing flow rate is induced in first and second diametrically-opposed electrodes projecting into said tube; a balancing circuit for coupling said electrodes to the respective input terminals of an amplifier while compensating for the quadrature voltage induced in the leads extending from said electrodes, said circuit comprising:

A. a transformer assembly having first and second sections each having a primary and a secondary, and B. first and second coaxial cables each having an inner conductor surrounded by an outer shielding conductor, said first and second electrodes being respectively connected through said first and second inner conductors in series with the secondaries of said first and second sections to the input terminals of said amplifier, the primaries of said first and second sections being connected through said outer conductors to external points on the circumference of said metallic flow tube whereby quadrature voltage induced in said outer conductors and applied to said primaries acts in opposition to quadrature voltage induced in said inner conductors and applied to said secondaries, whereby the signal applied to said amplifier is substantially free of a quadrature voltage component.

2. A balancing circuit as set forth in claim 1, wherein said transformer sections have a one-to-one ratio whereby said opposing quadrature voltages effectively cancel each other.

3. A balancing circuit as set forth in claim 1, wherein said primaries are constituted by a single center-tapped primary.

4. A balancing circuit as set forth in claim 3, wherein said amplifier is a differential amplifier and said center tap is connected to the reference terminal of the amplifier.

5. A balancing circuit as set forth in claim 1, wherein said primary sections are constituted by the halves of a single primary winding.

6. A balancing circuit as set forth in claim 5, wherein said amplifier is a differential amplifier whose reference terminal is connected to said metallic flow tube at a position midway between the point at which the outer conductors are connected.

7. A balancing circuit as set forth in claim 5, wherein said amplifier is a differential amplifier whose reference terminal is connected to the junction of one of said outer conductors and one end of said primary winding.

8. A balancing circuit as set forth in claim 1, wherein said coaxial cables each include an intermediate tubular shielding conductor surrounding said inner conductor and connected to an axiallycontrolled capacitive shield operated by a voltage derived from said amplifier.

* * * * *

UNITED STATES PATENT OFFICE
CERTIFICATE OF CORRECTION

PATENT NO. : 3,926,049
DATED : December 16, 1975
INVENTOR(S) : Albert Seebode, Eggert Appel and Gottfried Geisler It is certified that error appears in the above-identified patent and that said Letters Patent are hereby corrected as shown below:

IN THE TITLE "OR" should have read -- FOR --
Column 1, line 2 "OR" should have read -- FOR --
          line 8, "guadrature" should have read -- quadrature --
Column 2, line 19 "calbes" should have read -- cables --
          line 64 "asembly" should have read -- assembly --
Column 3, line 29 "cmponent" should have read -- component --
          line 42 "winging" should have read -- winding --
          line 61 "cnductor" should have read -- conductor --
Column 4, line 18 "alternatingcurrent" should have read
-- alternating-current --
Column 5, line 5 "axiallycontrolled" should have read
-- axially-controlled --

Signed and Sealed this ninth Day of March 1976

[SEAL]

Attest:

RUTH C. MASON
*Attesting Officer*

C. MARSHALL DANN
*Commissioner of Patents and Trademarks*